(12) United States Patent
Kang (10) Patent No.: US 11,735,365 B2
(45) Date of Patent: Aug. 22, 2023

(54) MULTILAYER CAPACITOR, BOARD FOR MOUNTING THE SAME, AND METHOD OF MANUFACTURING THE SAME

(71) Applicant: SAMSUNG ELECTRO-MECHANICS CO., LTD., Suwon-si (KR)

(72) Inventor: Dongwoo Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 65 days.

(21) Appl. No.: 17/331,006

(22) Filed: May 26, 2021

(65) Prior Publication Data

US 2022/0122777 A1 Apr. 21, 2022

(30) Foreign Application Priority Data

Oct. 21, 2020 (KR) .................. 10-2020-0136814

(51) Int. Cl.
*H01G 4/30* (2006.01)
*H01G 2/06* (2006.01)
*H01G 4/12* (2006.01)
*H01G 4/012* (2006.01)

(52) U.S. Cl.
CPC .............. *H01G 4/30* (2013.01); *H01G 2/065* (2013.01); *H01G 4/012* (2013.01); *H01G 4/1209* (2013.01)

(58) Field of Classification Search
CPC .......... H01G 4/30; H01G 2/065; H01G 4/012; H01G 4/1209; H01G 4/232; H01G 4/248
USPC ...................... 361/301.4, 306.3, 321.1, 321.3
See application file for complete search history.

(56) References Cited

U.S. PATENT DOCUMENTS

| 2015/0170786 | A1 | 6/2015 | Hong et al. | |
| 2017/0271083 | A1* | 9/2017 | Makino | H01G 4/30 |
| 2018/0144863 | A1* | 5/2018 | Kim | C01B 32/23 |
| 2019/0272955 | A1* | 9/2019 | Oh | H01G 4/30 |
| 2020/0308457 | A1* | 10/2020 | Kim | C08K 3/08 |

FOREIGN PATENT DOCUMENTS

| JP | 2011-190151 A | 9/2011 | |
| KR | 10-2015-0068622 A | 6/2015 | |
| KR | 1891141 B1 * | 8/2018 | ............. C01B 32/20 |
| KR | 10-2079178 B1 | 2/2020 | |

* cited by examiner

*Primary Examiner* — Arun Ramaswamy
(74) *Attorney, Agent, or Firm* — Morgan, Lewis & Bockius LLP (57) ABSTRACT

Provided are a multilayer capacitor and a board for mounting the same. The multilayer capacitor includes a capacitor body including a plurality of dielectric layers and a plurality of internal electrodes and a pair of external electrodes respectively including a conductive layer disposed on opposing ends of the capacitor, a conductive resin layer covering the conductive layer, and a reduced graphene oxide (RGO) layer disposed between the conductive layer and the conductive resin layer.

20 Claims, 6 Drawing Sheets

MULTILAYER CAPACITOR, BOARD FOR MOUNTING THE SAME, AND METHOD OF MANUFACTURING THE SAME

CROSS-REFERENCE TO RELATED APPLICATION(S)

This application claims the benefit under 35 USC 119(a) of Korean Patent Application No. 10-2020-0136814 filed on Oct. 21, 2020 in the Korean Intellectual Property Office, the entire disclosure of which is incorporated herein by reference for all purposes.

TECHNICAL FIELD

The present disclosure relates to a multilayer capacitor and a board for mounting the same.

BACKGROUND

Multilayer capacitors (or multilayer ceramic capacitors (MLCCs)) are compact, ensure high capacitance, and are easy to mount.

In recent years, as demand for in-vehicle electric components as well as an information technology (IT) field has increased, multilayer capacitors having stable mechanical properties and high reliability are required to be developed.

Here, in order to ensure stable mechanical properties and reliability of multilayer capacitors, a secondary external electrode including a conductive resin is used but there may be a problem in that a lifting phenomenon may occur between a surface of a metal as a main component of a primary external electrode and an interface of the secondary external electrode formed of the conductive resin.

SUMMARY

Exemplary embodiments provide a multilayer capacitor and a board for mounting the same, capable of preventing a lifting phenomenon occurring at an interface between a conductive layer of an external electrode and a conductive resin layer.

According to an exemplary embodiment, a multilayer capacitor includes: a capacitor body including a plurality of dielectric layers and a plurality of internal electrodes; and a pair of external electrodes respectively including a conductive layer disposed on opposing ends of the capacitor body, a conductive resin layer covering the conductive layer, and a reduced graphene oxide (RGO) layer disposed between the conductive layer and the conductive resin layer.

The RGO layer may be continuously disposed on the conductive layer.

The RGO layer may have an island shape on the conductive layer.

The capacitor body may include first and second surfaces opposing each other and third and fourth surfaces connected to the first and second surfaces and opposing each other, the internal electrodes may include first and second internal electrodes having one ends alternately exposed through the third and fourth surfaces of the capacitor body and connected to the external electrodes disposed on the third and fourth surfaces of the capacitor body, respectively, and the dielectric layer may be interposed the first and second internal electrodes.

The pair of external electrodes may further respectively include a plating layer covering the conductive resin layer.

The plating layer may include: a nickel plating layer covering the conductive resin layer; and a tin plating layer covering the nickel plating layer.

A thickness of the reduced graphene oxide (RGO) layer may be 1 nm or more than 50 nm or less.

According to an exemplary embodiment, a board for mounting a multilayer capacitor includes: a substrate having a pair of electrode pads disposed to be spaced apart from each other on one surface thereof; and a multilayer capacitor mounted on the substrate, wherein the multilayer capacitor includes: a capacitor body including a plurality of dielectric layers and a plurality of internal electrodes; and a pair of external electrodes respectively including a conductive layer disposed on opposing ends of the capacitor, a conductive resin layer covering the conductive layer, and a reduced graphene oxide (RGO) layer disposed between the conductive layer and the conductive resin layer, and connected to the pair of the electrode pads, respectively.

According to an exemplary embodiment, a method of manufacturing a multilayer capacitor includes: forming a capacitor body including a plurality of dielectric layers and first and second internal electrodes; forming a conductive layer including a metal on the capacitor body to connect to one of the first and second internal electrodes; forming a coating layer including graphene oxide on the first conductive layer; forming a conductive resin layer covering the coating layer including graphene oxide; and performing a heat treatment to the coating layer including graphene oxide and the conductive resin layer.

A reduced graphene oxide (RGO) layer may be formed of the coating layer including graphene oxide by the heat treatment.

The coating layer including graphene oxide may be formed by spraying a graphene oxide solution.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Exemplary embodiments of the present disclosure will now be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least an example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Hereinafter, to clarify an exemplary embodiment in the present disclosure, directions of the capacitor body 110 shown in the drawings are defined as follows: X, Y and Z represent a length direction, a width direction, and a thickness of a capacitor body 110, respectively. Further, in the present exemplary embodiment, the Z direction may be used to have the same concept as a stacking direction in which the dielectric layers are stacked.

Figure 1:
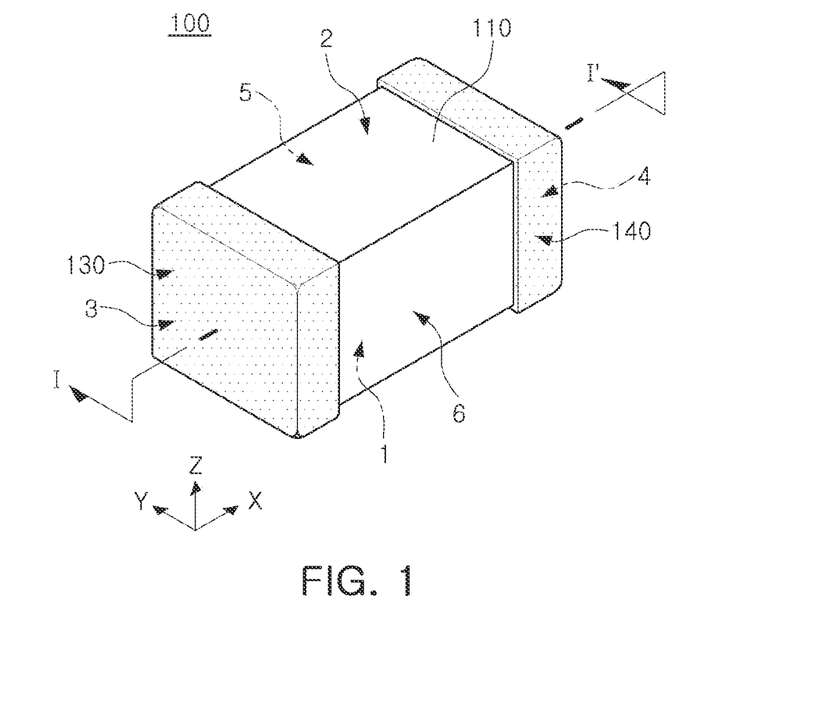
FIG. 1 is a schematic perspective view of a multilayer capacitor according to an exemplary embodiment in the present disclosure.
Figure 2A:
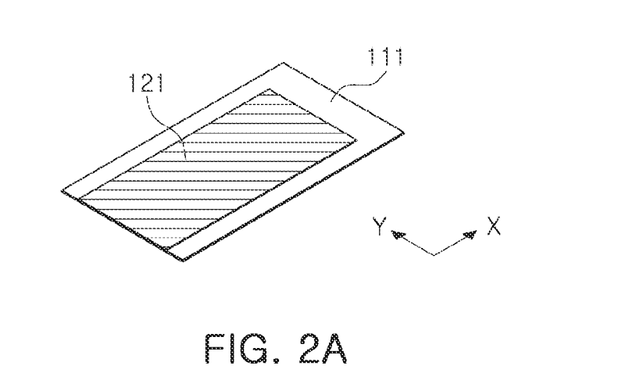
FIGS. 2A to 2B are perspective views illustrating first and second internal electrodes applied to the multilayer capacitor of FIG. 1, respectively.
Figure 2B:
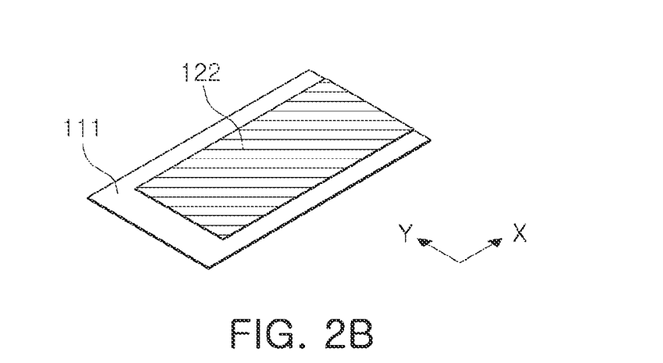
Figure 3:
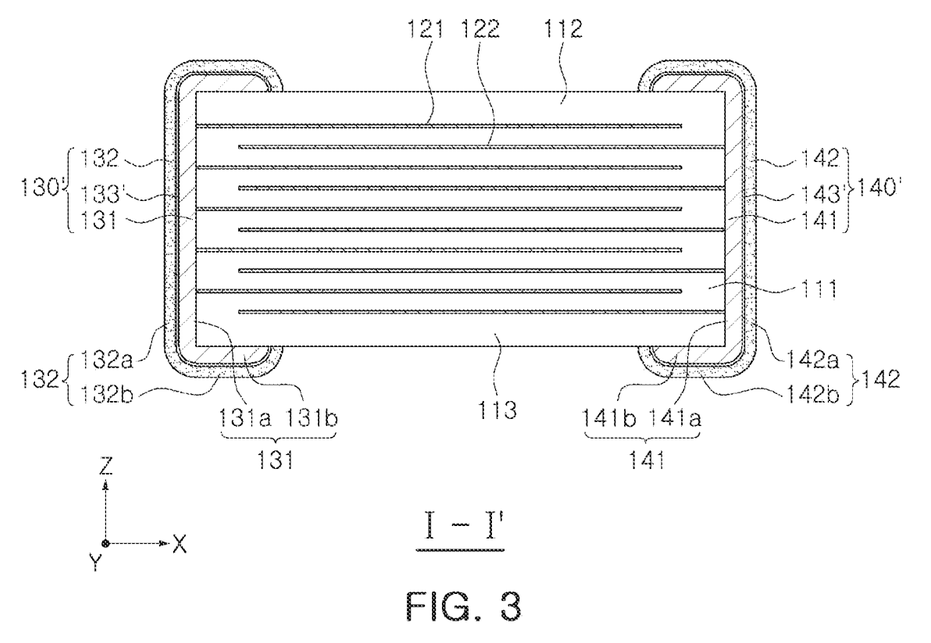
FIG. 3 is a cross-sectional view taken along line I-I' of FIG. 1.

FIG. 1 is a schematic perspective view of a multilayer capacitor according to an exemplary embodiment in the present disclosure, FIGS. 2A to 2B are perspective views illustrating first and second internal electrodes applied to the multilayer capacitor of FIG. 1, respectively, and FIG. 3 is a cross-sectional view taken along line I-I' of FIG. 1.

Referring to FIGS. 1 through 3, a multilayer capacitor 100 according to the present exemplary embodiment includes a capacitor body 110 and first and second external electrodes 130 and 140.

The capacitor body 110 is obtained by stacking a plurality of dielectric layers 111 in the Z direction and then sintering the same, and adjacent dielectric layers 111 of the capacitor body 110 may be integrated such that boundaries therebetween may not be readily apparent without using a scanning electron microscope (SEM).

Here, the capacitor body 110 may have a substantially hexahedral shape, but the present disclosure is not limited thereto. Further, the shape and dimensions of the capacitor body 110 and the number of stacked dielectric layers 111 are not limited to those shown in the drawings of the present exemplary embodiment.

In this exemplary embodiment, for convenience of description, both surfaces of the capacitor body 110 opposing each other in the Z direction are defused as first and second surfaces 1 and 2, both surfaces connected to the first and second surfaces 1 and 2 and opposing each other in the X direction are defined as third and fourth surfaces 3 and 4, and both surfaces connected to the first and second surfaces 1 and 2, connected to the third and fourth surfaces 3 and 4, and opposing each other in the Y direction are defined as fifth and sixth surfaces 5 and 6.

In addition, in the present exemplary embodiment, a mounting surface of the multilayer capacitor 100 may be the first surface 1 of the capacitor body 110.

The dielectric layer 111 may include a ceramic material having a high dielectric constant and may include, for example, barium titanate ($BaTiO_3$)-based or strontium titanate ($SrTiO_3$)-based ceramic powder, etc., but the present disclosure is not limited thereto as long as sufficient capacitance may be obtained.

In addition, ceramic additives, organic solvents, plasticizers, binders and dispersants may be further added to the dielectric layer 111 along with the ceramic powder.

As the ceramic additives, for example, a transition metal oxide or a transition metal carbide, a rare earth element, magnesium (Mg), or aluminum (Al) may be used.

The capacitor body 110 may include an active region as a portion contributing to the formation of capacitance of the capacitor and upper and lower covers 112 and 113 formed as upper and lower margins on the upper and lower surfaces of the active region in the Z direction, respectively.

The upper and lower covers 112 and 113 may have the same material and configuration as those of the dielectric layer 111, except that they do not include internal electrodes.

These upper and lower covers 112 and 113 may be formed by stacking a single dielectric layer or two or more dielectric layers on the upper and lower surfaces of the active region in the Z direction, respectively, and basically, serve to prevent damage to the first and second internal electrodes 121 and 122 due to physical or chemical stress.

The first and second internal electrodes 121 and 122 are electrodes to which different polarities are applied. The first and second internal electrodes 121 and 122 are alternately disposed along the Z direction with the dielectric layer 111 interposed therebetween and one ends thereof may be exposed through the third and fourth surfaces 3 and 4 of the capacitor body 110, respectively.

In this case, the first and second internal electrodes 121 and 122 may be electrically insulated from each other by the dielectric layer 111 disposed therebetween.

In this manner, the ends of the first and second internal electrodes 121 and 122 alternately exposed through the third and fourth surfaces 3 and 4 of the capacitor body 110 may be electrically connected to first and second conductive layers 131 and 141 of first and second external electrodes 130 and 140 disposed on the third and fourth surfaces 3 and 4 of the capacitor body 110 to be described later, respectively.

According to the above configuration, when a predetermined voltage is applied to the first and second external electrodes 130 and 140, electric charges are accumulated between the first and second internal electrodes 121 and 122.

Here, capacitance of the multilayer capacitor 100 is proportional to an area of overlap of the first and second internal electrodes 121 and 122 overlapping each other along the Z direction in the active region.

In addition, a material for forming the first and second internal electrodes 121 and 122 is not particularly limited and may be formed using a conductive paste including at least one of a noble metal material such as platinum (Pt), palladium (Pd), a palladium-silver (Pd—Ag) alloy, etc., nickel (Ni), and copper (Cu).

Here, as a printing method of the conductive paste, a screen printing method or a gravure printing method may be used but the present disclosure is not limited thereto.

The first and second external electrodes 130 and 140 may be provided with voltages of different polarities, may be disposed at both ends of the capacitor body 110 in the X direction, and may be electrically connected to exposed portions of the first and second internal electrodes 121 and 122.

Here, the first and second external electrodes 130 and 140 include first and second conductive layers 131 and 141 formed on a surface of the capacitor body 110 and connected to the first and second internal electrodes 121 and 122, respectively, and first and second conductive resin layers 132 and 142 formed to cover the first and second conductive layers 131 and 141, respectively.

The first conductive layer 131 may include a first inner connection portion 131a and a first inner band portion 131b.

The first inner connection portion 131a is a portion formed on the third surface 3 of the capacitor body 110 and connected to the first internal electrode 121, and the first inner band portion 131b is a portion extending from the first inner connection portion 131a to a portion of the first surface 1 of the capacitor body 110.

Here, the first inner band portion 131b may further extend to portions of the fifth and sixth surfaces 5 and 6 of the capacitor body 110 and a portion of the second surface 2 to improve adhesion strength, etc.

The second conductive layer 141 may include a second inner connection portion 141a and a second inner band portion 141b.

The second inner connection portion 141a is a portion formed on the fourth surface 4 of the capacitor body 110 and connected to the second internal electrode 122, and the second inner band portion 141b is a portion extending from the second inner connection portion 141a to a portion of the first surface 1 of the capacitor body 110.

Here, the second inner band portion 141b may further extend to portions of the fifth and sixth surfaces 5 and 6 of the capacitor body 110 and a portion of the second surface 2 of the capacitor body 110 to improve adhesion strength, etc.

In this case, the first and second conductive layers 131 and 141 may include at least one of nickel (Ni), copper (Cu), and silver (Ag) and may further include glass.

The first conductive resin layer 132 may include a first outer connection portion 132a and a first outer band portion 132b.

The first outer connection portion 132a is a portion that covers the first inner connection portion 131a, and the first outer band portion 132b is a portion that covers the first inner band portion 131b of the capacitor body 110 and extends to a portion of the first surface 1 of the capacitor body 110.

Here, the first outer band portion 132b may further extend to portions of the fifth and sixth surfaces 5 and 6 of the capacitor body 110 and a portion of the second surface 2 according to a structure of the first inner band portion 131b.

That is, a length of the first inner band portion 131b in the first conductive layer 131 may be shorter than a length of the first outer band portion 132b in the first conductive resin layer 132.

The second conductive resin layer 142 may include a second outer connection portion 142a and a second outer band portion 142b.

The second outer connection portion 142a is a portion that covers the second inner connection portion 141a, and the second outer band portion 142b is a portion that covers the second inner band portion 141b and extends to a portion of the first surface 1 of the capacitor body 110.

Here, the second outer band portion 142b may further extend to portions of the fifth and sixth surfaces 5 and 6 of the capacitor body 110 and a portion of the second surface 2 of the capacitor body 110 according to a structure of the second inner band portion 141b.

That is, a length of the second inner band portion 141*b* in the second conductive layer 141 may be shorter than a length of the second outer band portion 142*b* in the second conductive resin layer 142.

These first and second conductive resin layers 132 and 142 provide a stress absorbing effect and may include conductive particles and a thermosetting resin as a base resin.

In this case, the conductive metal may be at least one of copper (Cu), nickel (Ni), zinc (Zn), and iron (Fe), but the present disclosure is not limited thereto.

In addition, the thermosetting resin may be, for example, an epoxy resin, but the present disclosure is not limited thereto.

In addition, when a plating layer is additionally formed on surfaces of the first and second conductive resin layers 132 and 142, the plating layer may serve to prevent penetration of a plating solution into the first and second conductive layers 131 and 141 and the capacitor body 110 and prevent cracking of the first and second external electrodes 130 and 140 or the capacitor body 110 due to an external shock.

In addition, the first external electrode 130 may include a first reduced graphene oxide (RGO) 133' disposed between the first conductive layer 131 and the first conductive resin layer 132.

In this case, the first RGO layer 133' may be continuously formed as a single body on the first conductive layer 131.

Figure 4:
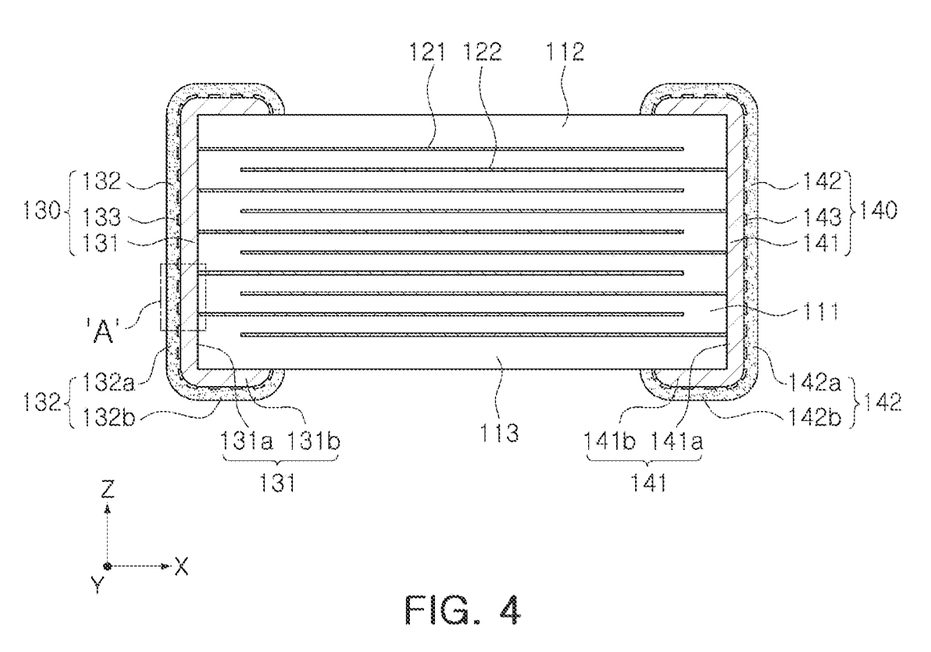
FIG. 4 is a cross-sectional view illustrating a reduced graphene oxide (RGO) layer according to another exemplary embodiment in the present disclosure.
Figure 5:
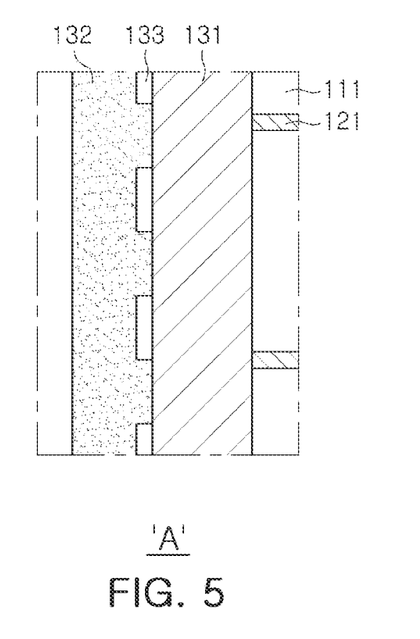
FIG. 5 is an enlarged cross-sectional view of portion A of FIG. 4.

As another example, as shown in FIGS. 4 and 5, a plurality of first RGO layers 133 may be formed in an island shape on the first conductive layer 131 and spaced apart from each other.

The first RGO layer 133' may be formed by applying a graphene oxide to the surface of the first conductive layer 131.

Here, a spray coating method may be used to evenly apply the graphene oxide.

The graphene oxide thinly applied on the first conductive layer 131 through the spray coating method is heat-treated at 240° C., a curing temperature of the first conductive resin layer 132, for 24 hours to form the first RGO layer 133'.

A preferred thickness of the first RGO layer 133' may be 50 nm or less.

If the thickness of the first RGO layer 133' exceeds 50 nm, the first RGO layer 133' may not be formed properly and may be unexpectedly separated from the first conductive layer 131.

Here, the first RGO layer 133' may be 1 nm or more.

Here, an optimal thickness of the first RGO layer 133' may be obtained by adjusting a spray injection amount, a concentration of a sprayed graphene oxide solution, and the number of spray coatings. The thickness of the first RGO layer 133', the second RGO layer 143' to be described later, or the like, may be measured in a cross section, for example, in an X-Z plane, cutting a central portion of the ceramic body 110 in the Y direction, or an X-Y plane, cutting a central portion of the ceramic body 110 in the Z direction, performed by a transmission electron microscopy (TEM). Other methods and/or tools appreciated by one of ordinary skill in the art, even if not described in the present disclosure, may also be used. In one example, the thickness may be one of an average thickness, a maximum thickness, and a thickness of the RGO layer measured in a measured region. In one example, the thickness of the RGO layer may be determined by defining a predetermined number (e.g., 5) of points to the left and the predetermined number (e.g., 5) of points to the right from a reference center point of the element at equal intervals (or non-equal intervals, alternatively), measuring a thickness of each of the points at equal intervals (or non-equal intervals, alternatively), and obtaining an average value therefrom. Alternatively, the thickness may be the maximum thickness of the multiple measurements. Alternatively, the thickness may be a thickness of the reference center point in the measured region.

The second external electrode 140 may include a second RGO 143' disposed between the second conductive layer 141 and the second conductive resin layer 142.

Here, the second RGO layer 143' may be continuously formed as a single body on the second conductive layer 141.

As another example, as shown in FIGS. 4 and 5, a plurality of second RGO layers 143 may be formed in an island shape on the second conductive layer 141 and spaced apart from each other.

The second RGO layer 143' may be formed by applying RGO on the surface of the second conductive layer 141.

Here, a spray coating method may be preferably used to evenly apply the RGO.

The graphene oxide thinly applied on the second conductive layer 141 through the spray coating method is heat-treated at 240° C., a curing temperature of the second conductive resin layer 142, for 24 hours to form the second RGO layer 143'.

A preferred thickness of the second RGO layer 143' may be 50 nm or less.

If the thickness of the second RGO layer 143' exceeds 50 nm, the second RGO layer 143' may not be formed properly and may be unexpectedly separated from the second conductive layer 141.

Here, the second RGO layer 143' may be 1 nm or more.

Here, an optimal thickness of the second RGO layer 143' may be obtained by adjusting a spray injection amount, a concentration of a sprayed graphene oxide solution, and the number of spray coatings.

Figure 6:
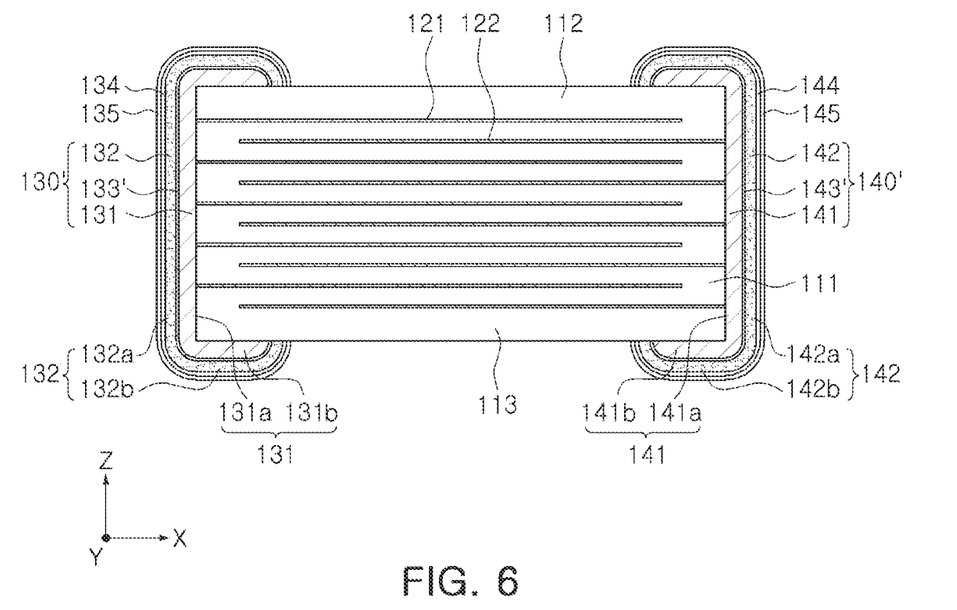
FIG. 6 is a cross-sectional view illustrating a plating layer further disposed in FIG. 3.

Meanwhile, as shown in FIG. 6, the first and second external electrodes 130 and 140 may further include a plating layer formed to cover the first and second conductive resin layers 132 and 142.

The plating layer may include first and second nickel (Ni) plating layers 134 and 144 covering the first and second conductive resin layers 132 and 142, respectively, and first and second tin (Sn) plating layers 135 and 145 covering the first and second nickel plating layers 134 and 144, respectively.

In the related art multilayer capacitor in which the external electrode includes a conductive layer and a conductive resin layer, the conductive layer and the conductive resin layer are bonded to each other only through hydrogen bonds with relatively weak bonding strength having bond energy of 10 to 40 KJ/mol.

Therefore, a carbon dioxide gas generated from a curing agent inside the conductive resin layer in a chip reflow process cannot be discharged to the outside and stays to cause a lifting defect between the conductive layer and the conductive resin layer.

In this exemplary embodiment, when the epoxy forms adhesion on a surface of the conductive layer with Zn, Cu, and Fe, transition metals, charges are transferred from a d orbital of a transition metal to a p orbital of oxygen in the epoxy group and a n orbital of benzene to form a bond layer.

Figure 7:
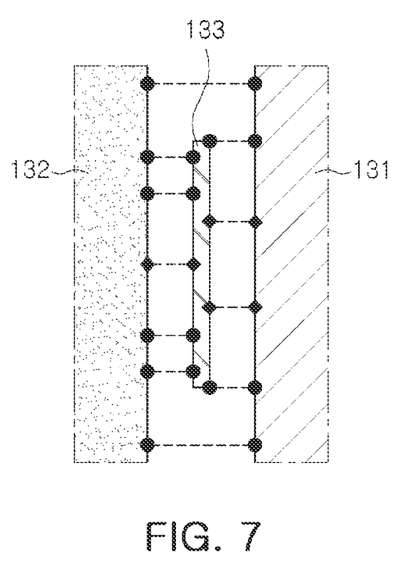
FIG. 7 is a schematic view illustrating a coupling structure of a conductive layer, a conductive resin layer, and an RGO layer.

Here, as shown in FIG. 7, the RGO layer 133 having various functional groups including oxygen and having excellent electrical conductivity may be disposed between the conductive layer 131 and the conductive resin layer 132 to provide additional hydrogen bonds (indicated by circles)

and n-n bonds (indicated by diamonds) at an interface between the conductive layer 131 and the conductive resin layer 132.

Also, the RGO layer allows stress applied to the external electrodes to be stably transmitted to the interface between the conductive layer and the conductive resin layer, thereby reducing acoustic noise and improving mechanical properties of the conductive resin layer.

By these actions, the RGO layer may minimize the phenomenon that the conductive resin layer is lifted from the conductive layer.

Therefore, the multilayer capacitor according to the present exemplary embodiment may be advantageously used in applications requiring a reduction in acoustic noise, strong bending strength, high moisture resistance, and high capacitance.

Figure 8:
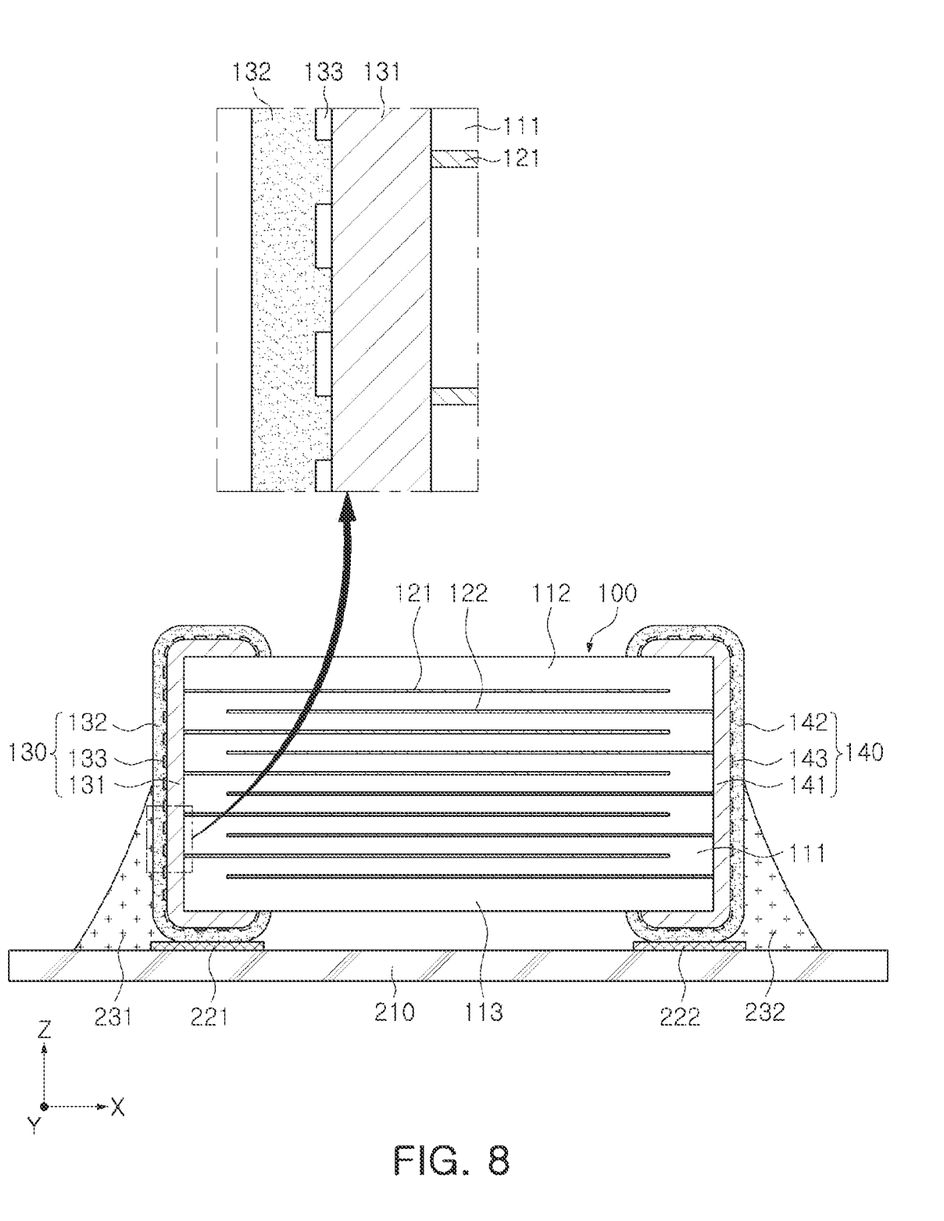
FIG. 8 is a schematic cross-sectional view illustrating a state in which the multilayer capacitor of FIG. 4 is mounted on a substrate.

FIG. 8 is a cross-sectional view schematically illustrating a state in which the multilayer capacitor of FIG. 4 is mounted on a substrate.

Referring to FIG. 8, a mounting board according to the present exemplary embodiment includes a substrate 210 and first and second electrode pads 221 and 222 disposed to be spaced apart from each other on an upper surface of the substrate 210.

Here, the multilayer capacitor 100 is mounted on the substrate 210 such that the first and second external electrodes 130 and 140 are positioned to be in contact with the first and second electrode pads 221 and 222, respectively.

Here, the first external electrode 130 may be bonded to the first electrode pad 221 by a solder 231 so as to be electrically and physically connected, and the second external electrode 140 may be bonded to a solder 232 so as be electrically and physically connected to the second electrode pad 222.

As set forth above, according to an exemplary embodiment, a phenomenon in which the conductive resin layer is lifted from the conductive layer in the external electrode of the multilayer capacitor may be improved.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
    a capacitor body including a plurality of dielectric layers and a plurality of internal electrodes; and
    a pair of external electrodes respectively including a conductive layer disposed on opposing ends of the capacitor body, a conductive resin layer covering the conductive layer, and a reduced graphene oxide (RGO) layer disposed between the conductive layer and the conductive resin layer,
    wherein an interface is defined between the RGO layer and at least one of the conductive layer or the conductive resin layer.

2. The multilayer capacitor of claim 1, wherein the RGO layer is continuously disposed on the conductive layer.

3. The multilayer capacitor of claim 1, wherein the RGO layer has an island shape on the conductive layer.

4. The multilayer capacitor of claim 1, wherein the capacitor body includes first and second surfaces opposing each other and third and fourth surfaces connected to the first and second surfaces and opposing each other,
    the internal electrodes include first and second internal electrodes having one ends alternately exposed through the third and fourth surfaces of the capacitor body and connected to the external electrodes disposed on the third and fourth surfaces of the capacitor body, respectively, and
    the dielectric layer is interposed the first and second internal electrodes.

5. The multilayer capacitor of claim 1, wherein the pair of external electrodes further respectively include a plating layer covering the conductive resin layer.

6. The multilayer capacitor of claim 5, wherein the plating layer includes a nickel plating layer covering the conductive resin layer and a tin plating layer covering the nickel plating layer.

7. The multilayer capacitor of claim 1, wherein a thickness of the reduced graphene oxide (RGO) layer is 1 nm or more than 50 nm or less.

8. A board for mounting a multilayer capacitor, the board comprising:
    a substrate having a pair of electrode pads disposed to be spaced apart from each other on one surface thereof; and
    a multilayer capacitor mounted on the substrate,
    wherein the multilayer capacitor includes:
    a capacitor body including a plurality of dielectric layers and a plurality of internal electrodes; and
    a pair of external electrodes respectively including a conductive layer disposed on opposing ends of the capacitor, a conductive resin layer covering the conductive layer, and a reduced graphene oxide (RGO) layer disposed between the conductive layer and the conductive resin layer, and connected to the pair of the electrode pads, respectively,
    wherein an interface is defined between the RGO layer and at least one of the conductive layer or the conductive resin layer.

9. The board of claim 8, wherein the RGO layer is continuously disposed on the conductive layer.

10. The board of claim 8, wherein the RGO layer has an island shape on the conductive layer.

11. The board of claim 8, wherein the capacitor body includes first and second surfaces opposing each other and third and fourth surfaces connected to the first and second surfaces and opposing each other,
    the internal electrodes include first and second internal electrodes having one ends alternately exposed through the third and fourth surfaces of the capacitor body and connected to the external electrodes disposed on the third and fourth surfaces of the capacitor body, respectively, and
    the dielectric layer is interposed therebetween the first and second internal electrodes.

12. The board of claim 8, wherein the pair of external electrodes further respectively include a plating layer covering the conductive resin layer.

13. The board of claim 12, wherein the plating layer includes a nickel plating layer covering the conductive resin layer and a tin plating layer covering the nickel plating layer.

14. The board of claim 8, wherein a thickness of the reduced graphene oxide (RGO) layer is 1 nm or more than 50 nm or less.

15. A method of manufacturing a multilayer capacitor, the method comprising:
    forming a capacitor body including a plurality of dielectric layers and first and second internal electrodes;
    forming a conductive layer including a metal on the capacitor body to connect to one of the first and second internal electrodes;

forming a coating layer including graphene oxide on the conductive layer;

forming a conductive resin layer covering the coating layer including graphene oxide; and performing a heat treatment to the coating layer including graphene oxide and the conductive resin layer, wherein an interface is defined between the coating layer and at least one of the conductive layer or the conductive resin layer.

16. The method of claim 15, wherein a reduced graphene oxide (RGO) layer is formed of the coating layer including graphene oxide by the heat treatment.

17. The method of claim 16, wherein the RGO layer is continuously disposed on the conductive layer.

18. The method of claim 16, wherein the RGO layer has an island shape on the conductive layer.

19. The method of claim 16, wherein a thickness of the reduced graphene oxide (RGO) layer is 1 nm or more than 50 nm or less.

20. The method of claim 15, wherein the coating layer including graphene oxide is formed by spraying a graphene oxide solution.

\* \* \* \* \*